(12) United States Patent
Mathew et al.

(10) Patent No.: US 7,602,812 B2
(45) Date of Patent: Oct. 13, 2009

(54) CLIENT FOR VIDEO STREAM PLAY AND METHOD THEREOF

(75) Inventors: Manu Mathew, Suwon-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 11/097,083

(22) Filed: Apr. 4, 2005

(65) Prior Publication Data

US 2005/0232290 A1    Oct. 20, 2005

(30) Foreign Application Priority Data

Apr. 2, 2004    (KR) .................... 10-2004-0022980

(51) Int. Cl.
*H04J 3/06* (2006.01)
(52) U.S. Cl. ...................................... 370/503; 370/536
(58) Field of Classification Search ................. 370/412, 370/503, 504, 536, 415, 429, 528, 535, 229, 370/230, 235, 419, 465, 474, 508, 542; 725/38, 725/54, 68, 151, 70, 131, 139
See application file for complete search history.

(56) References Cited

U.S. PATENT DOCUMENTS

| | | | |
|---|---|---|---|
| 5,652,627 A * | 7/1997 | Allen | .......................... 348/497 |
| 5,726,989 A * | 3/1998 | Dokic | ......................... 370/509 |
| 5,767,746 A * | 6/1998 | Dieterich | ..................... 331/17 |
| 6,101,195 A | 8/2000 | Lyons et al. | |
| 6,188,703 B1 * | 2/2001 | Dobson et al. | ............... 370/537 |

(Continued)

FOREIGN PATENT DOCUMENTS

EP    0 987 894 A2    3/2000

(Continued)

OTHER PUBLICATIONS

Jinyong Jo et al:, "Evaluation on the performance of adaptive playout for the multicast streaming of stored media", ICC 2003. 2003 IEEE International Conference on Communications, Anchorage AK, May 11-15, 2003, IEEE International Conference on Communications, New York, NY: IEEE, US. vol. 1 of 5, May 11, 2003, pp. 542-546, XP010642808.

(Continued)

*Primary Examiner*—Kwang B Yao
*Assistant Examiner*—Anh Ngoc Nguyen
(74) *Attorney, Agent, or Firm*—Sughrue Mion, PLLC (57) ABSTRACT

A client for playing a video stream and a method thereof adaptively control the video play in accordance with variable communication environments and the size of the video stream to be transmitted. The client includes a demultiplexer for generating elementary stream (ES) packets by demultiplexing a video stream; a FIFO buffer for temporarily storing the ES packets; a play timing modification unit for reducing a gap of a play time caused by a burst error by modifying time stamps of the ES packets that exist in the FIFO buffer if it is judged that the burst error occurs; and a video decoder for generating an output video by decoding the ES packets of which the time stamps are modified. The client can relatively improve the quality of the video streaming in multimedia communications through a wireless or wire network.

20 Claims, 8 Drawing Sheets

U.S. PATENT DOCUMENTS

| | | | |
|---|---|---|---|
| 6,247,072 | B1 | 6/2001 | Firestone |
| 6,292,834 | B1 | 9/2001 | Ravi et al. |
| 7,031,306 | B2 * | 4/2006 | Amaral et al. ............. 370/389 |
| 2003/0212997 | A1 | 11/2003 | Hejna, Jr. |
| 2003/0226093 | A1 * | 12/2003 | Kono et al. ................ 714/776 |
| 2004/0073949 | A1 * | 4/2004 | Chen et al. ................. 725/135 |
| 2004/0170162 | A1 * | 9/2004 | Hung .......................... 370/389 |
| 2004/0223551 | A1 * | 11/2004 | Hannuksela ........... 375/240.25 |
| 2005/0021811 | A1 * | 1/2005 | Roelens ...................... 709/231 |

FOREIGN PATENT DOCUMENTS

| | | | |
|---|---|---|---|
| JP | 9-298734 | A | 11/1997 |
| KR | 2002-0000745 | A | 1/2002 |
| KR | 2003-0076077 | A | 9/2003 |
| KR | 2003-0079337 | A | 10/2003 |
| KR | 1020040018979 | A | 3/2004 |

OTHER PUBLICATIONS

Steinbach E et al:, "Adaptive playout for low latency video streaming", Oct. 7, 2001, Proceedings 2001 International Conference on Image Processing. ICIP 2001. Thessaloniki, Greece, Oct. 7-10, 2001, International Conference on Image Processing, New York, NY: IEEE, US. pp. 962-965, XP010565021.

* cited by examiner

CLIENT FOR VIDEO STREAM PLAY AND METHOD THEREOF

CROSS-REFERENCE TO RELATED APPLICATION

This application claims priority from Korean Patent Application No. 10-2004-0022980 filed on Apr. 2, 2004 in the Korean Intellectual Property Office, the disclosure of which is incorporated herein by reference in its entirety.

BACKGROUND OF THE INVENTION

1. Field of the Invention

The present invention relates generally to video play, and more particularly to a client for playing video stream and a method thereof that adaptively control the video play in accordance with variable communication environments and the size of the video stream to be transmitted.

2. Description of the Prior Art

Figure 1:
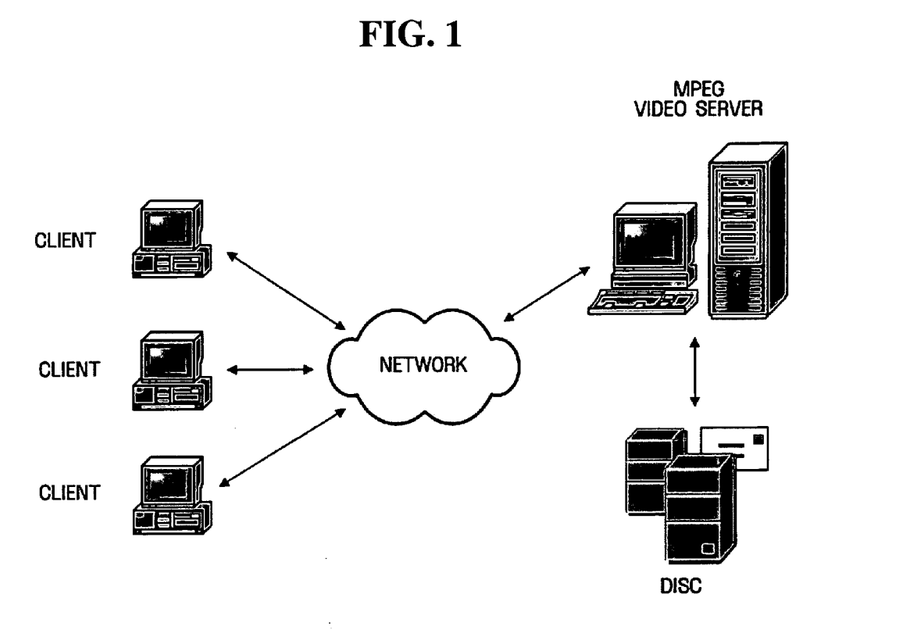
FIG. 1 is a view illustrating a conventional streaming system.

A conventional streaming system is illustrated in FIG. 1. The conventional system includes a streaming server, client terminals (hereinafter referred to as "clients"), and a packet network (hereinafter referred to as a "channel"). Media are transmitted from the server to the clients using a transport protocol such as a User Datagram Protocol (UDP), Real Time Protocol (RTP), Transmission Control Protocol (TCP), Hypertext Transfer Protocol (HTTP), etc.

For more efficient streaming, the system may use a streaming control channel such as a Real Time Streaming Protocol (RTSP), Microsoft Media Server (MMS), etc.

Meanwhile, the quality of the video stream received by the client is as important as video data itself since there is no person who wants to view video frames having many errors. Main factors that affect the quality of the video stream may be a bandwidth-limited network, packet loss, delay jitter, etc.

(i) Bandwidth-Limited Network

It is sometimes difficult to secure a sufficient bandwidth for transmitting video streams. In order to solve this, video streams having a low bandwidth may be used. In the case of the video stream compressed by a codec that supports the scalability, it is easy to convert the video stream so that it has a lower bandwidth. However, in the case of a general Video on Demand (VOD), the scalability is hardly supported, and thus it is difficult to reduce the bandwidth of the compressed video stream.

(ii) Packet Loss

Packets transmitted from a server may be lost and not reach a client. In this case, a video output corresponding to the lost packets does not appear on the client side.

A user may have difficulty in sensing an error caused by such a packet loss through the use of a proper error concealment algorithm. For instance, in the MPEG-2 stream, an error concealment algorithm for reconstructing lost motion vectors using adjacent motion vectors may be used.

(iii) Delay Jitter

It is difficult to estimate an accurate reaching time of the packet transmitted through a packet transmission network. This may cause an unwanted result on the client side. Although a video decoder waits for the packet, it may not reach at a desired time. This problem may be solved through the use of a pre-roll buffer on the client side. Although the pre-roll buffer causes an additional delay during the play of the video stream, it makes the problems caused by the delay jitter to be almost solved.

As the prior art for solving the problems of the video streaming using the network as described above, a dynamic streaming bandwidth control, an adaptive media play, etc., have been proposed.

The dynamic streaming bandwidth control will be explained. A client can feed information about the amount of data that remains in a client buffer back to a server. If the level of the client buffer is low, the streaming rate increases, while if the level of the client buffer is high, the streaming rate decreases. Since the client buffer is empty at the initial stage of streaming, the client requests the server to stream more promptly. Accordingly, the startup delay or pre-roll delay of the streaming can be reduced.

Figure 2:
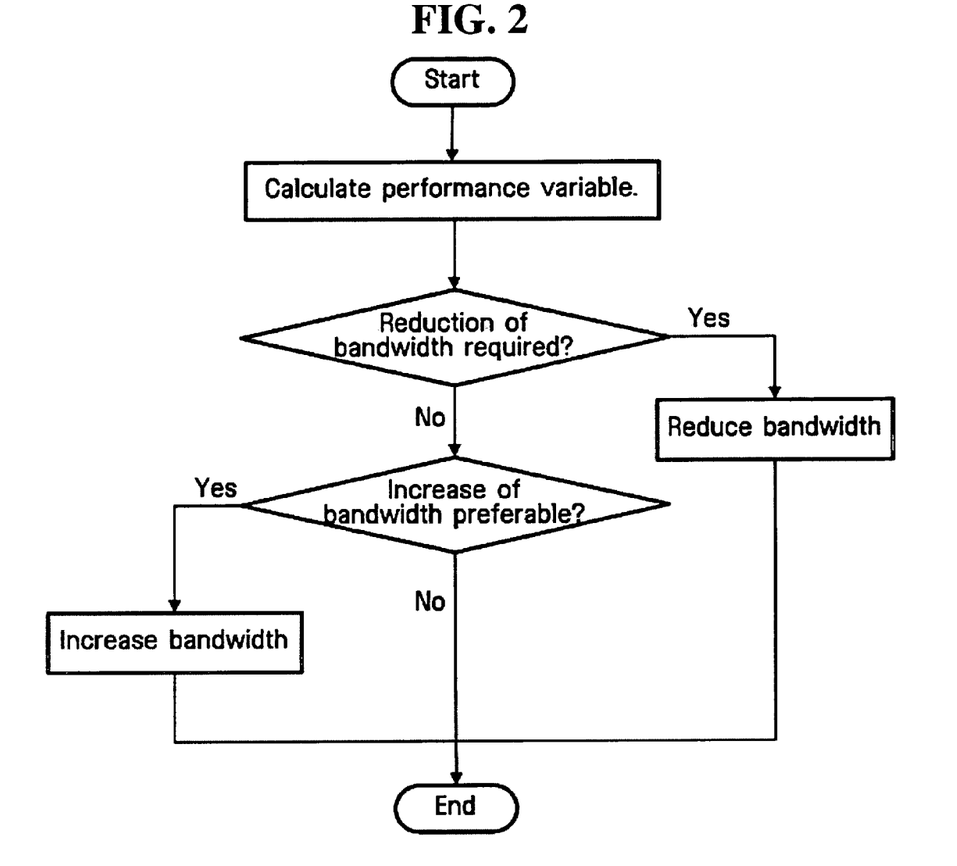
FIG. 2 is a flowchart schematically illustrating a conventional dynamic streaming bandwidth control method.

In the method as described above, a considerable amount of video data is cached, and thus the client may not be affected by a slight change of bandwidth. U.S. Pat. No. 6,292,834 entitled "Dynamic bandwidth selection for efficient transmission of multimedia streams in a computer network" discloses a basic algorithm for the above-described method, which is illustrated in FIG. 2.

Meanwhile, the adaptive media play method is used as an algorithm for the concealment of errors occurring due to a buffer underflow. In this method, if the buffer level is lowered below a specified threshold value, the video play speed becomes slow, but the video play is not stopped. Then, if the buffer level is heightened above the specified threshold value, the video play speed returns to the original speed. However, this method increases the total play time of the media.

The dynamic bandwidth control algorithm as described above operates properly if a sufficient bandwidth is secured, but does not operate properly if an available bandwidth is narrow. A multicast communication in a wireless LAN may serve as an example. A wireless interface card limits the available bandwidth to about 10% of the whole available bandwidth. However, it is common to be faced with a case that the bandwidth of a data stream to be transmitted, i.e., a source stream, is wider than the available bandwidth. In this case, the bandwidth of the source stream should be reduced, and if the compression codec does not support the scalability, the server side will experience congestion.

Meanwhile, if successive losses or errors occur during the transfer of a video stream through a network, the video play may be stopped at times.

Although the conventional adaptive media play method refers to a method of a video stream play, which is transmitted at a low speed, without a freezing phenomenon, it has no relation with or is not suitable to the solution of the problems that successive losses or errors occur in packets that constitute the video stream.

SUMMARY OF THE INVENTION

The present invention provides a client for playing video stream and a method thereof that adaptively control the video play in the event that successive losses or errors (i.e., burst errors) of packets occur during the transmission of the video streams.

The present invention also provides a method and a video server for efficiently performing a packet drop in the event that a transmission bandwidth of a server side is narrower than a bandwidth of a video stream.

According to an aspect of the present invention, there is provided a client for playing video stream, comprising a demultiplexer for generating elementary stream (ES) packets by demultiplexing video streams; a FIFO buffer for temporarily storing the ES packets; a play timing modification unit for reducing a gap of a play time caused by a burst error by modifying time stamps of the ES packets that exist in the FIFO buffer if it is judged that the burst error occurs; and a video decoder for generating an output video by decoding the ES packets of which the time stamps are modified.

In another aspect of the present invention, there is provided a method for a video stream play, which comprises generating elementary stream (ES) packets by demultiplexing video streams; temporarily storing the ES packets; reducing a gap of a play time caused by a burst error by modifying time stamps of the stored ES packets if it is judged that the burst error occurs; and generating an output video by decoding the ES packets of which the time stamps are modified.

The burst error may occur by partly dropping the packets of the complete video stream through a server side that provides the video stream.

The packets may be partially dropped if a bit rate of the complete video stream is larger than an available bandwidth of a transmitter side.

The time stamps may be presentation time stamps (PTS).

Reduction of the gap of the play time may be performed through the modification of the time stamps so that play times of the ES packets existing in the FIFO buffer are arranged at equal intervals.

Reduction of the gap of the play time may be performed through the modification of the time stamps so that play times of the ES packets existing in the FIFO buffer are arranged at smaller intervals as a packet loss part becomes more distant.

Modification of the time stamp may be performed by performing a forward correction routine with respect to the packets before the burst error occurrence among the packets stored in the FIFO buffer and performing a reverse correction routine with respect to the packets after the burst error occurrence.

Judgment of the burst error occurrence may be based on whether a difference between the time stamps of adjacent packets exceeds a specified threshold value.

BRIEF DESCRIPTION OF THE DRAWINGS

The above and other aspects of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. The matters defined in the description such as a detailed construction and elements are nothing but the ones provided to assist in a comprehensive understanding of the invention. Thus, it is apparent that the present invention can be carried out without those defined matter. In the following description of the present invention, the same drawing reference numerals are used for the same elements even in different drawings. Also, a detailed description of known functions and configurations incorporated herein will be omitted when it may make the subject matter of the present invention rather unclear.

If the bit rate of a video stream is larger than an available bandwidth of a transmitter side, it should be reduced in the case of streaming an additional video stream. If a codec used to generate the video stream is scalable, it is easy to reduce the bit rate. Otherwise, a transcoding should be performed. Here, the transcoding means a process of releasing a compressed video stream and then compressing the released video stream again. This transcoding, however, requires a high computing power.

As a method for reducing the bandwidth, a method of selectively dropping the packets may be selected. The packets to be dropped should be properly selected so that the drop of the packets does not cause a great amount of distortion (i.e., a difference between the original video and the final video). Since the drop of intra-coded type packets causes a great distortion, it should be avoided if possible.

In dropping the packets, the drop of the packets in succession until no transmission error occurs is more advantageous than the drop of the packets not in succession. If the server side performs the successive packet drop as described above, the client side will necessarily experience the burst error.

The present invention provides an efficient algorithm for dropping the packets in succession. An example of such an algorithm is shown in Table 1 below.

TABLE 1

```
#define PERCENTAGE_PACKET_DROP 5
iPacketCount=0;
iPacketDropCount=0;
While(1)
{
iPacketCount++;
thisPacket = GetPacket( );
if(iPacketDropCount==0)
{
  err = SendPacket(thisPacket);
  if(err)
  {
  iPacketDropCount=iPacketCount*PERCENTAGE_PACKET_DROP/
  100;
  iPacketCount=0;
  }
}
  else
{
  iPacketDropCount--;
}
}
```

According to the algorithm, 'PERCENTAGE_PACKET_DROP' (i.e., percentage of packet drop) is defined. Although in the exemplary embodiment of the present invention, this value is set to '5', it may be set so that the bandwidth of the video stream after the packet drop is performed coincides with the transmission bandwidth.

Then, 'iPacketCount' (i.e., the number of packets) and 'iPacketDropCount' (i.e., the number of packet drops) are initialized, and a while loop is performed.

In the while loop, the 'iPacketCount' is increased by '1', and one packet is extracted from the transmission buffer. If the 'iPacketDropCount' is not '0', it is continuously decreased.

If the 'iPacketDropCount' is '0', the present packet is transmitted. If no error occurs during the packet transmission, the process returns to the beginning of the while loop. If an error occurs during the packet transmission, the 'iPacketDropCount' is set to a value obtained by multiplying the present 'iPacketCount' by the percentage of packet drop, and the 'iPacketCount' is updated to '0'. By repeating the above-described processes, the packet drop can be adaptively performed.

As shown in Table 1, if the transmission system is unable to transmit the packets, it starts the packet-dropping process. Since the transmission system does not attempt to transmit the packets during a packet-dropping period, it can take a sufficient time for recovering from the previous error (i.e., error due to the insufficient bandwidth or for other reasons).

A method of detecting an error during the packet transmission will be explained. The transmission system may use 'WSASend( )' that is a socket function call provided in MICROSOFT WINDOWS™. The 'WSASend( )' copies one packet (in the embodiment, a TS (Transport Stream) packet) into a socket buffer. If the socket buffer is full, the 'WSASend( )' returns a SOCKET_ERROR value. Since the actual data transmission rate is lower than the ratio of data copy into the socket buffer, the socket buffer is easily full.

A function named 'GetLastError( )' returns a WSAE-WOULDBLOCK value if an error occurs during the transmission. If the streaming system senses that it cannot transmit the packets, it applies a packet-dropping algorithm to the packets to be transmitted thereafter.

Although the use of the 'WSASend( )' has been described in the embodiment of the present invention, the packet-dropping algorithm can be applied to various socket-based transmission mechanisms.

If the packet-dropping algorithm is used, the burst error occurs on the client side. Also, even if the server side transmits the whole video stream without dropping the packets, the burst error may occur according to the communication protocol or network environment.

For the streaming, an unreliable protocol such as UDP is frequently used, and thus many errors may occur during the streaming. Accordingly, it is necessary to use a proper error concealment technique for concealing the errors that the user feels on the client side. The errors may be classified into a burst error and a non-burst error. The burst error means an error that is kept for a fairly long time, and frequently occurs in a wireless network environment.

As a result, if the burst error occurs for any reason, it is necessary for the client to use an adaptive media play method. However, it would be applied only to the video stream.

This is because an audio stream uses a relatively low bandwidth in comparison to the video stream, and thus it is not of much help to drop audio TS packets on the server side. In the same manner, there is no necessity for applying the adaptive media play method to the audio on the client side.

The present invention proposes an adaptive media play method provided for the case in which the burst error occurs. The burst error may cause a stop of the video play on the client side. Accordingly, it is necessary to provide an adaptive media play method for concealing the burst error.

Figure 3A:
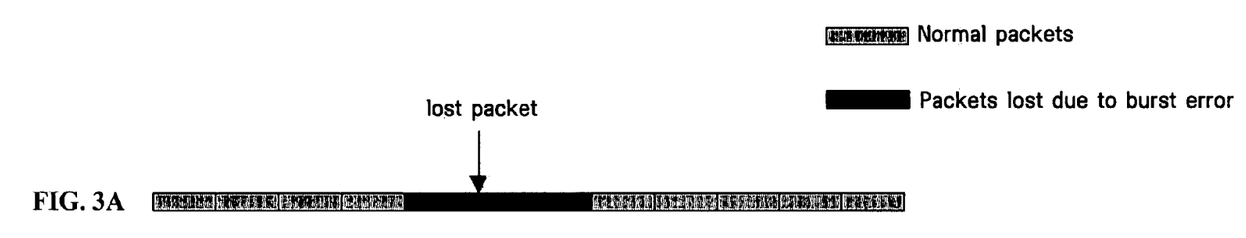
FIGS. 3A, 3B and 3C are views provided for explaining an adaptive media play method according to an exemplary embodiment of the present invention.
Figure 3B:
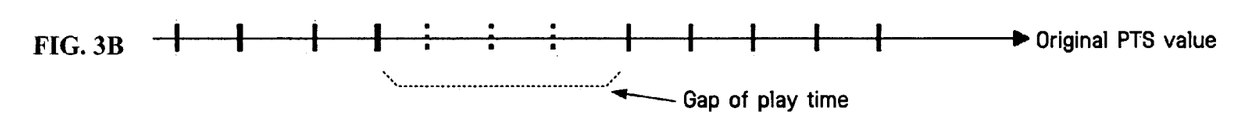
Figure 3C:
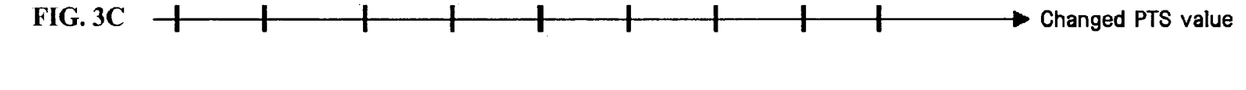

FIGS. 3A to 3C are views provided for explaining an adaptive media play method according to an exemplary embodiment of the present invention. Specifically, FIG. 3A shows an example of a video stream received on the client side if packets lost due to the burst error exist in succession, FIG. 3B shows the original PTS values owned by the whole packets, and FIG. 3C shows the PTS values changed by applying the adaptive media play method thereto.

In the case of playing the video stream as shown in FIG. 3A in accordance with the original PTS as shown in FIG. 3B, a gap of playback time occurs, and this causes a user to view a picture freezing phenomenon. In order to solve this problem and to provide a natural picture, the PTS values of the packets, which exist adjacent to a part where the lost packets are located, are modified through the adaptive media play method according to the present invention, and thus a picture changeover is performed smoothly.

By applying the method according to the present invention, a user may not recognize a little slow play, which may instantaneously be performed, if the burst error is not great. Also, although the user may recognize a slow play if the burst error is great, it is still more advantageous than the picture freezing that causes the user inconvenience.

Figure 4:
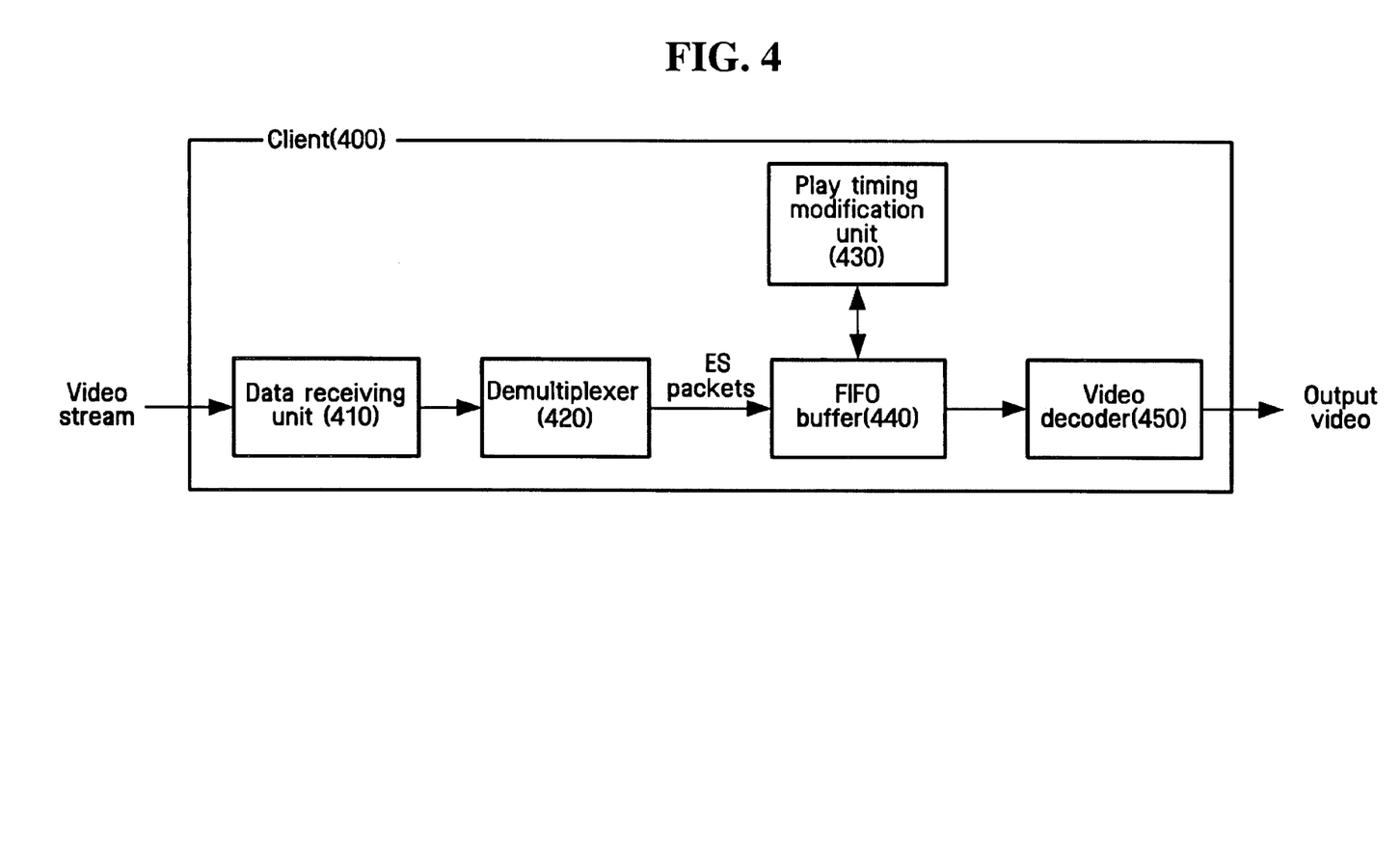
FIG. 4 is a block diagram illustrating the construction of a client according to an exemplary embodiment of the present invention.

FIG. 4 is a block diagram illustrating the construction of a client according to an exemplary embodiment of the present invention.

A client 400 reads video streams through a data-receiving unit 410. Although a video stream may appear in diverse forms, TS packets are taken as an example in the embodiment of the present invention. The data-receiving unit 410 may be implemented through a socket program.

The TS packets read by the data-receiving unit 410 are demultiplexed through a demultiplexer 420 to become Elementary Stream (ES) packets. Each of the ES packets includes video frame data and a Presentation Time Stamp (PTS) that is a time stamp for reporting a video play time.

The ES packets are temporarily stored in a FIFO buffer 440, and a PTS modification process is performed through a play timing modification unit 430. If a burst error occurs, i.e., if a gap of a play time more than a specified threshold value is produced, the play timing modification unit 430 reduces the gap by modifying the PTS of the ES packets existing in the FIFO memory 440. The PTS modification process will be explained later with reference to FIGS. 5 and 6.

The ES packets, which have passed the above-described modification process, are stored in the FIFO memory 440 again, and then input to a video decoder 450 in order. The video decoder 450 generates an output video by decoding the inputted ES packets.

In FIG. 4, the respective constituent element may be defined as a module. The module means software or hardware constituent elements such as FPGA, ASIC and so on, and plays a specified role. However, the module is not limited to the software or hardware. The module may be constructed so as to be in a storage medium that can be addressed or to execute one or more processors. For example, the module includes constituent elements such as software constituent elements, object-oriented software constituent elements, class constituent elements and task constituent elements, processes, functions, attributes, procedures, subroutines, segments of program codes, drivers, firmware, micro-codes, circuitry, data, databases, data structures, tables, arrays and variables. The constituent elements and functions provided in the modules may be combined together to form a smaller number of modules, or may be divided into additional modules. In addition, the modules may be implemented so as to execute one or more computers in a communication system.

Meanwhile, the PTS modification algorithm, which is performed in the play timing modification unit 430, distributes and arranges the packets except for the packets stored in the FIFO buffer, i.e., the packets lost due to the burst error, if the burst error occurs. This packet distribution and arrangement method may be classified into a method of arranging the packets so that the packets are arranged at smaller time intervals as the part where the error occurs becomes far off, and a method of arranging the packet at equal intervals.

Figure 5:
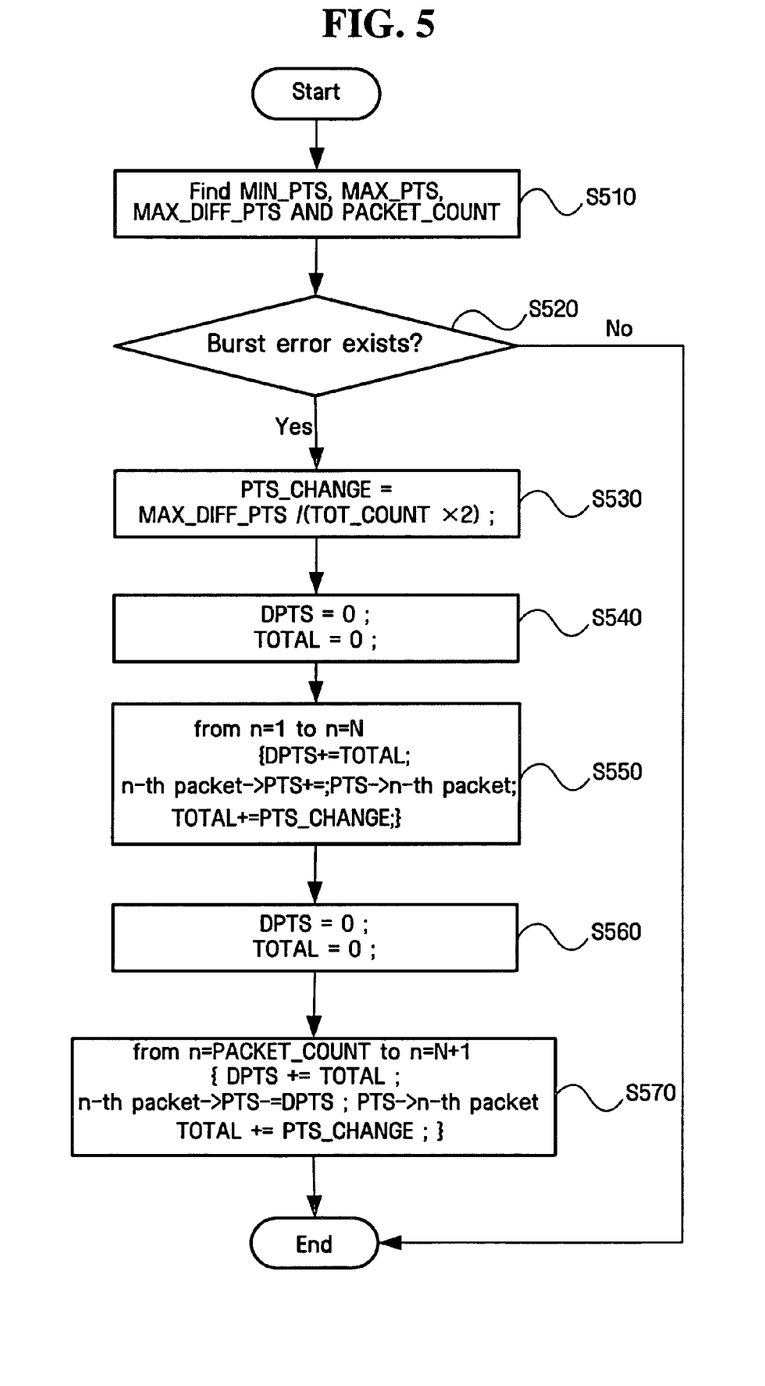
FIG. 5 is a flowchart illustrating an algorithm for arranging packets so that play times of the packets are arranged at smaller intervals as a packet loss part becomes more distant.

The algorithm for arranging the packets at smaller intervals as the packet-loss part becomes far off is illustrated in FIG. 5.

Referring to FIG. 5, values of MIN_PTS, MAX_PTS, MAX_DEFF_PTS and PACKET_COUNT are found from the packets stored in the FIFO buffer of the video decoder (operation S510). In the embodiment of the present invention, the MIN_PTS value is a PTS value of the first packet stored in the first packet, and the MAX_PTS value is a PTS value of the last packet. The MAX_DIFF_PTS is a maximum difference between the PTS values of the adjacent packets, and if the PTSs of the packets are arranged at equal intervals, the MAX_DIFF_PTS value is equal to the equal interval. If the burst error occurs and any PTS value between the specified packets is larger than the equal interval, the PTS value becomes the MAX_DIFF_PTS value. Also, the PACKET_COUNT means the number of packets stored in the present FIFO buffer.

If the found MAX_DIFF_PTS value exceeds a specified threshold value (for example, 300 ms), it is judged that the burst error occurs (operation S520). If no burst error occurs, the adaptive media play algorithm is terminated.

Then, the necessary change of the PTS value is calculated. The value obtained by dividing the MAX_DIFF_PTS by (TOT_COUNT×2) is defined as PTS_CHANGE (operation S530). Here, the TOT_COUNT means the total number of packets in the event that no burst error occurs. That is, the TOT_COUNT is a value obtained by adding the PACKET_COUNT to the number of packets lost due to the burst error. The number of packets lost due to the burst error can be easily known by comparing the MAX_DIFF_COUNT with the PTS interval between the packets.

Then, the initial values of DPTS and TOTAL are set to '0' (operation S540).

A forward correction routine is repeatedly performed for a period from the first packet to the packet just before the occurrence of the burst error (hereinafter referred to as the N-th packet), i.e., from n=1 to n=N, among the packets stored in the FIFO buffer (operation S550). Here, n is a dummy value that indicates the order of the packet stored in the FIFO buffer 440.

The forward correction routine includes the operations of updating the value obtained by adding the TOTAL to the DPTS as a new DPTS value, extracting the PTS value from the n-th packet and recording the value obtained by adding the updated DPTS to the PTS value as the PTS value of the n-th packet, and updating the value obtained by adding the PTS_CHANGE to the TOTAL as a new TOTAL.

After the operation S550 is performed, the DPTS and TOTAL values are set to '0' (operation S560).

A reverse correction routine is repeatedly performed in a reverse order for a period from the last packet to the packet just after the occurrence of the burst error (i.e., the (N+1)-th packet), i.e., from n=PACKET_COUNT to n=N+1, among the packets stored in the FIFO buffer (operation S570).

The reverse correction routine includes the operations of updating the value obtained by adding the TOTAL to the DPTS as a new DPTS value, extracting the PTS value from the n-th packet and recording the value obtained by subtracting the updated DPTS from the PTS value as the PTS value of the n-th packet, and updating the value obtained by adding the PTS_CHANGE to the TOTAL as a new TOTAL. After the operation S570, the routine is terminated.

It will be understood by those skilled in the art that in addition to the embodiment of the present invention as described above, the method for arranging the packets at smaller intervals as the packet-loss part becomes far off can be implemented by rearranging the packets through other related equations.

In addition to the algorithm for arranging the packets at unequal intervals as described above, the algorithm for arranging the packets at equal intervals may be used. This algorithm is illustrated in FIG. 6.

Figure 6:
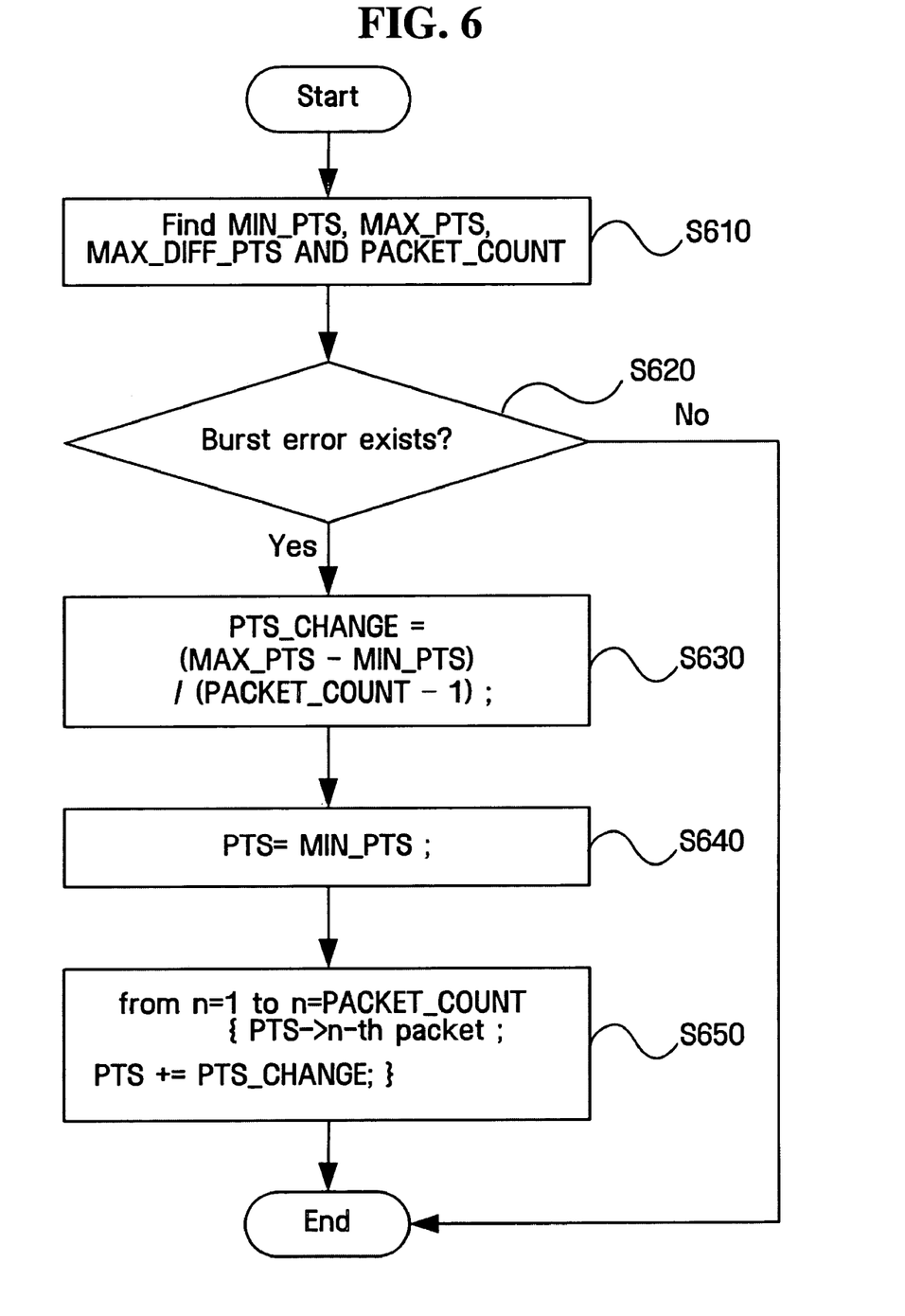
FIG. 6 is a flowchart illustrating an algorithm for arranging packets so that play times of the packets are arranged at equal intervals.

Referring to FIG. 6, values of MIN_PTS, MAX_PTS, MAX_DIFF_PTS and PACKET_COUNT are found from the packets stored in the FIFO buffer of the video decoder (operation S610).

If the found MAX_DIFF_PTS value exceeds a specified threshold value (for example, 300 ms), it is judged that the burst error occurs (operation S620). If no burst error occurs, the adaptive media play algorithm is terminated.

Then, the PTS_CHANGE is set to the value obtained by dividing the difference value between the MAX_PTS and the MIN_PTS by (PACKET_COUNT−1) (step S630). Also, the initial value of the PTS is set to '0' (operation S640).

An equal-interval correction routine is performed for a period from the first packet to the last packet among the packets stored in the FIFO buffer (operation S650). The equal-interval correction routine includes the operations of recording the present PTS value as the PTS value of the n-th packet, and updating the value obtained by adding the PTS_CHANGE to the present PTS value as a new PTS value. After the operation S650, the routine is terminated.

Figure 7A:
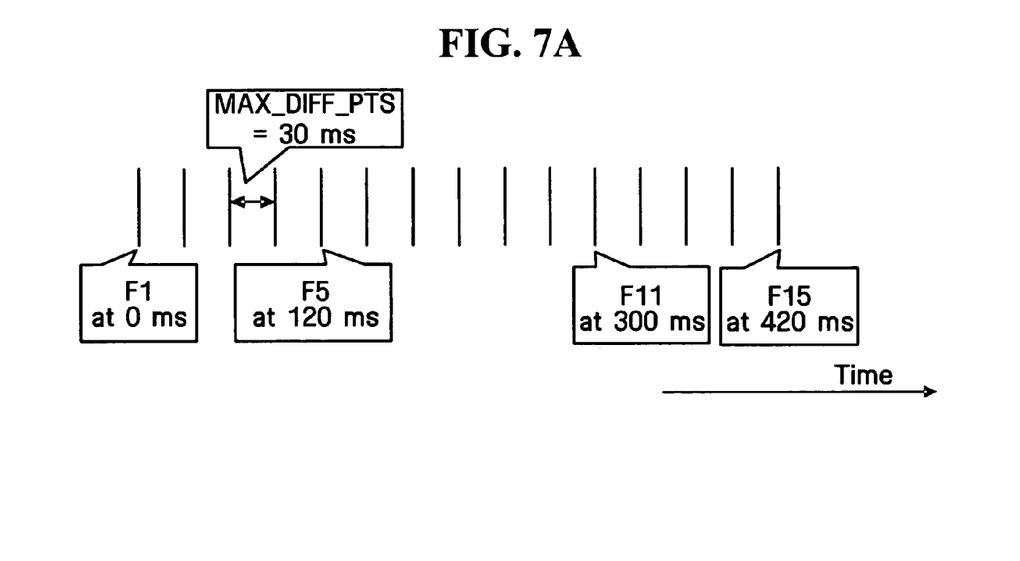
FIG. 7A is a view illustrating a time interval in a normal video having no error.

FIGS. 7A to 7D are views illustrating examples of the operations as shown in FIGS. 5 and 6. As shown in FIG. 7A, the number of packets in a normal video that has no error is 15, the time interval between the respective packets is 30 ms, and the first packet F1 is located at 0 ms. Accordingly, the last packet F15 is located at 420 ms.

Figure 7B:
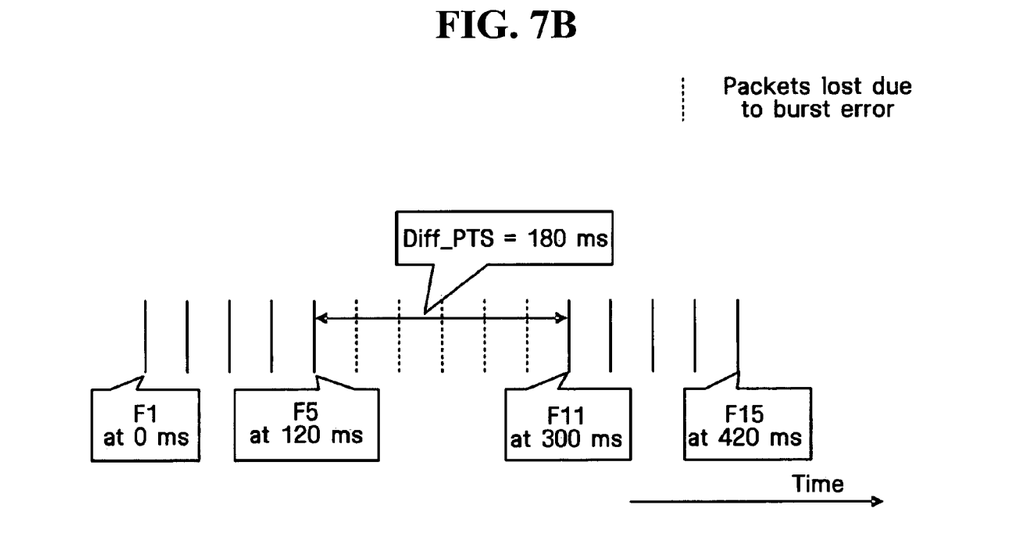
FIG. 7B is a view illustrating a time interval in the event that a burst error occurs.

If it is assumed that the packets F6 to F10 are lost due to the burst error as shown in FIG. 7B, the value of MAX_DIFF_PTS increases as much as the lost period to become 180 ms. If the video is played in this state, the video is stopped for 180 ms after the fifth packet F5 is displayed, and then the video is played again from the eleventh packet F11 that is normally received. Accordingly, the viewer may see the picture-freezing phenomenon.

In order to solve this problem and to provide a natural picture, the PTS values of the packets, which exist adjacent to the part where the lost packets are located, are modified through the adaptive media play method according to the present invention, and thus a picture changeover is performed smoothly. The results of arranging the packets at equal intervals and at unequal intervals are shown in FIGS. 7C and 7D.

Figure 7C:
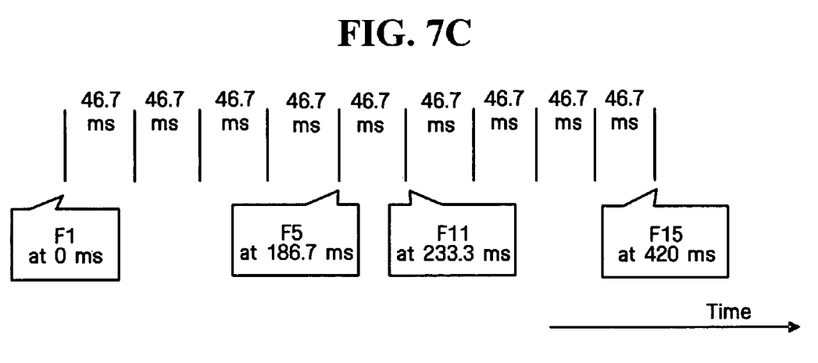
FIG. 7C is a view illustrating a time interval after the method as illustrated in FIG. 6 is applied to the video as illustrated in FIG. 7B.

In FIG. 7C, the packets are arranged at equal intervals, and the interval is 46.7 ms. Accordingly, for example, the PTS of F5 is modified to 186.7 ms, and the PTS of F11 is modified to 233.3 ms.

Figure 7D:
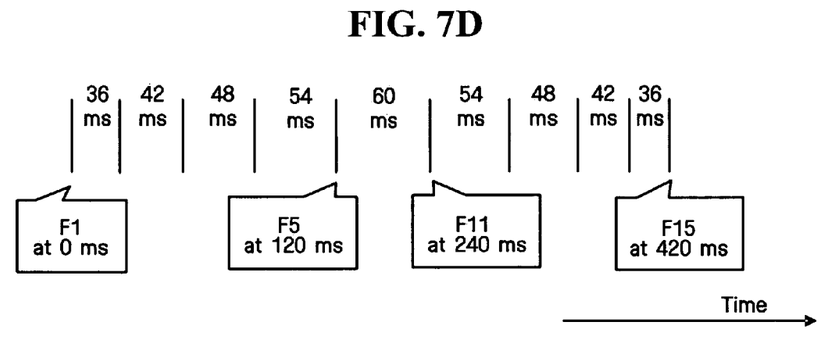
FIG. 7D is a view illustrating a time interval after the method as illustrated in FIG. 5 is applied to the video as illustrated in FIG. 7B.

Meanwhile, in FIG. 7D, since TOT_COUNT=15, MAX_DIFF_PTS=180 ms, the PTS_CHANGE becomes PTS_CHANGE=180/(15×2)=6 ms. Consequently, as the packet-loss part becomes near, the interval becomes wider, while as the packet-loss part becomes far off, the interval becomes narrower. For example, the PTS of F5 is modified to 120 ms, and the PTS of F11 is modified to 240 ms.

As described above, according to an exemplary embodiment of the present invention, the quality of the video streaming is relatively improved in multimedia communications through a wireless or wire network. Especially, the present invention is suitable for a peer-to-peer communications of two devices connected in a wireless network. Also, the picture freezing phenomenon appearing when the burst error occurs can be efficiently removed.

According to another exemplary embodiment of the present invention, the video streams can be transmitted with the play time maintained using the burst packet drop in the event that the channel bandwidth is not sufficiently secured in the video stream server. That is, the present invention has the effect of providing a pseudo-scalability to the video streams being transmitted.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A client terminal for playing a video stream, the client comprising:
    a demultiplexer which generates elementary stream (ES) packets by demultiplexing video stream;
    a buffer memory which temporarily stores the ES packets comprising time stamps;
    a play timing modification unit which reduces a gap of a play time caused by a burst error by modifying time stamps of the ES packets that are stored in the buffer memory based at least on a maximum difference between the time stamps of adjacent packets if it is judged that the burst error occurs; and
    a video decoder which generates an output video by decoding the ES packets of which the time stamps are modified.

2. The client terminal as claimed in claim 1, wherein the time stamps are presentation time stamps (PTS).

3. The client terminal as claimed in claim 1, wherein the play timing modification unit reduces the gap of the play time by modifying the time stamps so that play times of the ES packets existing in the buffer memory are arranged at equal intervals.

4. The client terminal as claimed in claim 1, wherein the play timing modification unit reduces the gap of the play time by modifying the time stamps so that play times of the ES packets existing in the buffer memory are arranged at smaller intervals as a packet loss part becomes more distant.

5. The client terminal as claimed in claim 4, wherein the modifying the time stamp is performed by performing a forward correction routine with respect to the ES packets before the burst error occurrence among the ES packets stored in the buffer memory and performing a reverse correction routine with respect to the ES packets after the burst error occurrence.

6. The client terminal as claimed in claim 1, wherein judgment of the burst error occurrence is based on whether a difference between the time stamps of adjacent packets exceeds a specified threshold value.

7. A method for playing a video stream, the method comprising:
    generating elementary stream (ES) packets by demultiplexing a video stream;
    temporarily storing the ES packets comprising time stamps;
    determining a maximum difference between the time stamps of adjacent packets;
    reducing a gap of a play time caused by a burst error by modifying the time stamps of the ES packets which are stored based at least on the determined maximum difference if it is judged that the burst error occurs; and
    generating an output video by decoding the ES packets of which the time stamps are modified.

8. The method as claimed in claim 7, wherein the burst error occurs by partly dropping the packets of the complete video stream through a server side that provides the video stream.

9. The method as claimed in claim 8, wherein the packets are partly dropped if a bit rate of the complete video stream is larger than an available bandwidth of a transmitter side.

10. The method as claimed in claim 7, wherein the time stamps are presentation time stamps (PTS).

11. The method as claimed in claim 7, wherein the reducing the gap of the play time is performed by modifying the time stamps so that play times of the ES packets are arranged at equal intervals.

12. The method as claimed in claim 7, wherein the reducing the gap of the play time is performed by modifying the time stamps so that play times of the ES packets are arranged at smaller intervals as a packet loss part becomes more distant.

13. The method as claimed in claim 12, wherein the modifying the time stamps is performed by performing a forward correction routine with respect to the ES packets before the burst error occurrence among the ES packets which are temporarily stored and performing a reverse correction routine with respect to the packets after the burst error occurrence.

14. The method as claimed in claim 7, wherein judgment of the burst error occurrence is based on whether a difference between the time stamps of adjacent ES packets exceeds a specified threshold value.

15. A recording medium in which a method for playing a video stream is recorded as a program readable by a computer, the method comprising:
    generating elementary stream (ES) packets by demultiplexing a video stream;
    temporarily storing the ES packets comprising time stamps;
    determining a maximum difference between the time stamps of adjacent packets;
    reducing a gap of a play time caused by a burst error by modifying time stamps of the ES packets which are stored based at least on the determined maximum difference if it is judged that the burst error occurs; and
    generating an output video by decoding the ES packets of which the time stamps are modified.

16. The method as claimed in claim 7, wherein the determining the maximum difference between the time stamps of adjacent packets comprises:
    determining differences between the time stamps of pairs of stored adjacent packets; and
    comparing the determined differences to one another.

17. The method as claimed in claim 16, further comprising:
    comparing each determined difference to a threshold value to determine that the burst error has occurred; and
    determining a start location and an end location of the burst error in the stored packets, based on the maximum difference.

18. The method as claimed in claim 17, further comprising:
    modifying the time stamps of the stored packets so that play times of the packets are arranged at sequentially increasing time intervals between the adjacent packets up to the start location and at sequentially decreasing time intervals between the adjacent packets after the end location.

19. The method as claimed in claim 18, wherein the time interval between the adjacent packets is based on an original time interval and a value of the maximum difference divided by a product of a total packet count and 2.

20. The method as claimed in claim 17, further comprising:
calculating a play time interval between the adjacent stored packets to be equal to a difference between the maximum difference and an original time interval divided by a number of the stored packets less one; and
increasing the time stamps of the stored packets by the calculated time interval.

* * * * *

UNITED STATES PATENT AND TRADEMARK OFFICE
CERTIFICATE OF CORRECTION

| | | |
|---|---|---|
| PATENT NO. | : 7,602,812 B2 | Page 1 of 1 |
| APPLICATION NO. | : 11/097083 | |
| DATED | : October 13, 2009 | |
| INVENTOR(S) | : Mathew et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Fifth Day of October, 2010

David J. Kappos
*Director of the United States Patent and Trademark Office*